J. L. BURNHAM.
DYNAMO ELECTRIC MACHINE.
APPLICATION FILED APR. 12, 1909. RENEWED JAN. 26, 1911.

1,000,776.

Patented Aug. 15, 1911.

2 SHEETS—SHEET 1.

Witnesses:
George W. Tilden
J. Ellis Glen

Inventor:
Joseph L. Burnham,
by [signature]
Att'y.

UNITED STATES PATENT OFFICE.

JOSEPH L. BURNHAM, OF SCHENECTADY, NEW YORK, ASSIGNOR TO GENERAL ELECTRIC COMPANY, A CORPORATION OF NEW YORK.

DYNAMO-ELECTRIC MACHINE.

1,000,776.

Specification of Letters Patent. Patented Aug. 15, 1911.

Application filed April 12, 1909, Serial No. 489,515. Renewed January 26, 1911. Serial No. 604,875.

*To all whom it may concern:*

Be it known that I, JOSEPH L. BURNHAM, a citizen of the United States, residing at Schenectady, county of Schenectady, State of New York, have invented certain new and useful Improvements in Dynamo-Electric Machines, of which the following is a specification.

My invention relates to variable-voltage dynamo-electric machines of the commutator type, and its object is to provide a machine of novel design, such that it may be self-exciting and yet deliver its full-load current over a wide range of voltage.

Variable-voltage machines are used for many purposes, as, for instance, generators, supplying current to motors at different voltages for controlling the motor speed. Where the range of voltage is wide, it has not been found practicable heretofore to make the generator self exciting, for, as is well known in the art, the ordinary self-exciting shunt-wound generator will not carry its full load at low voltage but has a critical point below which it will not generate. For such machines it has, therefore, been the practice to provide separate exciters. By my invention I am able to operate a self-exciting generator at full load over a wide range of voltage. I accomplish this by providing in addition to the main brushes an auxiliary brush intermediate the main brushes, with means for maintaining a substantially constant induced armature voltage between the auxiliary brush and one main brush, and means for varying the induced armature voltage between the auxiliary brush and the other main brush. A portion of the field coils may be connected between the auxiliary brush and the first main brush, so that the current in these coils is constant, and the poles on which they are placed have a constant magnetization precisely as in the ordinary shunt-wound generator. The variation in the induced voltage between the auxiliary brush and the other main brush results in varying the induced voltage between the two main brushes, so that the machine may deliver its load over a wide range of voltage without danger of losing its magnetism.

My invention will best be understood by reference to the accompanying drawings, in which—

Figure 1:
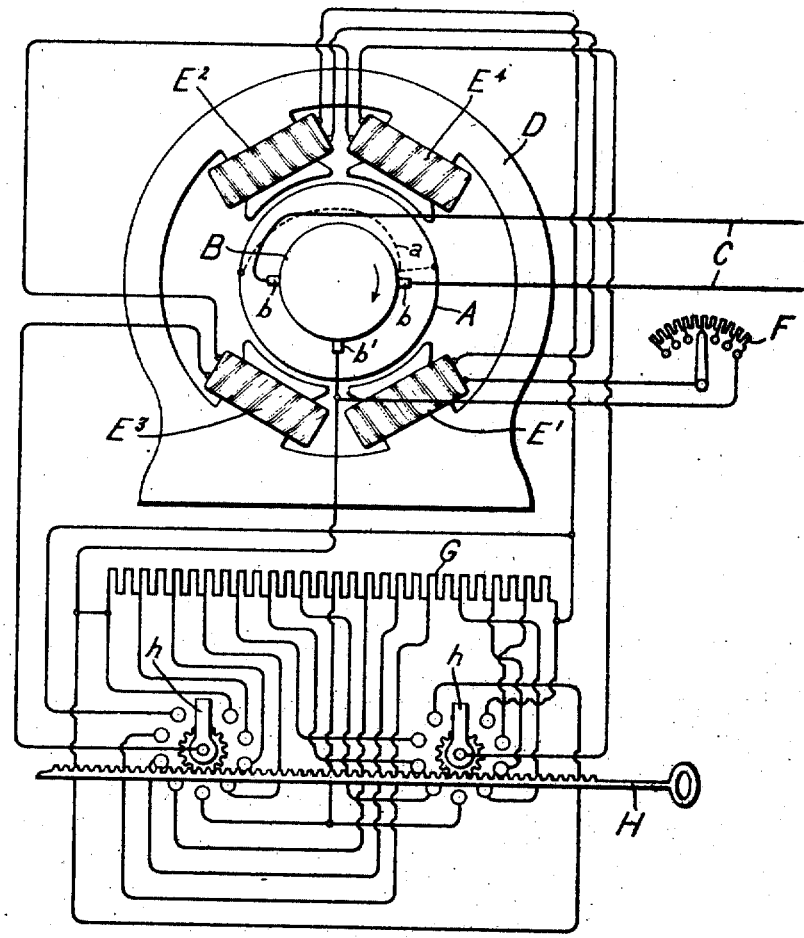
Figure 2:
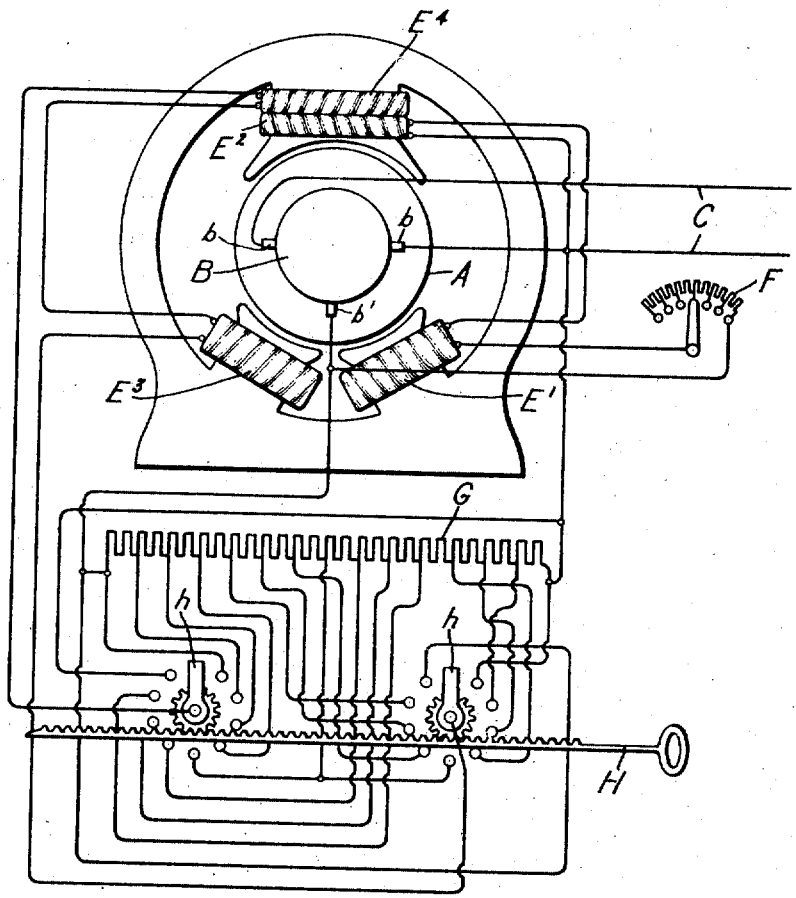

Figure 1 shows diagrammatically a bipolar variable-voltage self-exciting generator arranged in accordance with my invention; and Fig. 2 shows a modified structure.

In Fig. 1, A represents the armature, which is provided with a commutator B, main commutator brushes $b\ b$ displaced from each other, as is usual, approximately 180 electrical degrees, and an auxiliary brush $b^1$, substantially midway between the main brushes. In order that the operation of the machine may most conveniently be understood, I have shown the brushes placed in the positions they would occupy with a Gramme-ring armature, or in a drum-wound armature with the end-connections of the coils arranged as indicated by the dotted lines $a$,—that is, the brushes are directly opposite the conductors with which the commutator segments on which the brushes bear are in direct connection. C represents the load circuit, which is supplied from the main brushes $b\ b$. D represents the field magnet, which is in effect bipolar, but which has each pole split in half. The field coils $E^1\ E^2$ on diametrically opposite poles or pole-portions are connected between the auxiliary brush $b^1$ and the right-hand main brush $b$. The usual field rheostat F is placed in series with these coils for adjusting the current strength in them. Since the magnetization of the poles on which these coils are placed determines the armature voltage induced between the auxiliary and the right-hand main brush, and since these coils are connected between these two brushes, the conditions, so far as the induced voltage between these brushes and the magnetization are concerned, are precisely the same as in the ordinary shunt-wound generator,—that is, the armature voltage induced between these two brushes is substantially constant, and the current in the coils $E^1$ and $E^2$ and the magnetization of the poles on which they are placed are substantially constant. On the other two poles or pole-portions are placed coils $E^3$ and $E^4$, the current in which is varied so that the magnetization in these poles is varied. This magnetization determines the voltage induced between the auxiliary brush and the left-hand main brush, which, being variable and added to the constant voltage induced between the auxiliary brush and the right-hand main brush, gives a resultant variable voltage which is the voltage impressed on the load circuit. For instance, if the current in coils $E^3$ and $E^4$ is made the same as the current in coils $E^1$ and $E^2$, and the direction of that current is such that the poles carrying coils $E^1$ and $E^3$ are of opposite polarity, as, for instance, north and south respectively, while the poles carrying coils $E^2$ and $E^4$ are of south and north polarity, respectively, the voltages induced between the auxiliary brush and both main brushes will be the same, but in opposition, so far as the main brushes are concerned, so that the voltage between the main brushes will be zero. Now, if the current in coils $E^3$ and $E^4$ is gradually reduced, the voltage between the main brushes will gradually rise, until, when the current in the coils $E^3$ and $E^4$ becomes zero, the voltage between the main brushes will be the voltage induced between the auxiliary brush and the right-hand brush. Now, if the connections of the coils $E^3$ and $E^4$ are reversed, and the current is gradually increased, the currents induced in the two portions of the armature between the main brushes will be in the same direction and an increase of current in coils $E^3$ and $E^4$ will further increase the voltage supplied to the load-circuit. When the current in these coils again reaches the value of the current in coils $E^1$ and $E^2$, the machine will be in effect an ordinary bi-polar generator with the auxiliary brush $b^1$ at the neutral point with respect to the induced armature voltage between the main brushes $b$ $b$. As a convenient arrangement for varying and reversing the current in coils $E^3$ and $E^4$, I have shown a resistance G connected between the auxiliary brush $b^1$ and the right-hand main brush $b$, so that the voltage impressed on the terminals of this resistance is constant. H represents a switch-actuating member operating two contacts $h$ $h$, which are connected to the terminals of the coils $E^3$ and $E^4$. Two series of contacts adapted to be engaged by the two movable contacts $h$ $h$, respectively, are connected to different points on the resistance G. If the member H is moved so as to move contacts $h$ $h$ to the right, these contacts on engaging the first stationary contacts of the series will connect the coils $E^3$ and $E^4$ across the terminals of resistance G, so that the full voltage is impressed on these coils. As the movement of the contacts is continued, the points of connection of the field coils to the resistance are moved closer together, when the contacts $h$ have made half a revolution from the position shown, the terminals of the two field coils are both connected to the center of the resistance and the field coils therefore short-circuited. Further movement of the contacts $h$ $h$ shifts the points of connection of the coils to positions farther apart on the resistance, but in such a direction that the current in the coils is now reversed. When the movable contacts $h$ $h$ reach the last of the stationary contacts, the coils $E^3$ and $E^4$ again have impressed upon them the full voltage between the auxiliary brush and the right-hand main brush, but with that voltage in the opposite direction relative to its direction at starting. Since the current which is commutated beneath the auxiliary brush $b^1$ is always small, the interpolar space at this brush need not be large. In order to obtain the best commutation under the main brushes, the direction of rotation should be clockwise, as indicated by the arrow, so that the coils being commutated are approaching the poles of constant magnetization, so that commutation conditions are the same as in the ordinary shunt-wound machine.

As shown in Fig. 2, it is not necessary that all the field poles should be sub-divided. In that figure the coils $E^2$ and $E^4$ are placed in a single large pole, while coils $E^1$ and $E^3$ are placed on the two portions of a divided pole, as in Fig. 1. The operation of the modification of Fig. 2 is the same as that of Fig. 1. When the poles carrying coils $E^1$ and $E^3$ are of opposite polarity the currents in coils $E^2$ and $E^4$ are in opposition, so that the pole on which they are placed has no magnetization. When the current in coils $E^3$ and $E^4$ is zero, the total flux in the large pole is substantially the same as that in the pole carrying the coil $E^1$. When the poles carrying coils $E^1$ and $E^3$ are of the same polarity, the large pole is of the other polarity, and its total flux is the sum of the fluxes of the two poles.

The arrangement of Fig. 2 is cheaper than that of Fig. 1, but is somewhat less satisfactory from the electrical standpoint.

The machine as shown may also be operated as a variable-speed motor. When so operated, the direction of rotation for best commutation is opposite to that of the machine as a generator.

I do not desire to limit myself to the particular construction and arrangement of parts here shown, but aim in the appended claims to cover all modifications which are within the scope of my invention.

What I claim as new and desire to secure by Letters Patent of the United States, is:—

1. A variable-voltage self-exciting commutator machine, comprising main brushes displaced from each other by substantially 180 electrical degrees, an auxiliary brush intermediate the main brushes, means for maintaining a substantially constant induced armature voltage between the auxiliary brush and one main brush, and means for varying the induced armature voltage between the auxiliary brush and the other main brush.

2. A variable-voltage self-exciting commutator machine, comprising main brushes displaced from each other by substantially 180 electrical degrees, an auxiliary brush intermediate the main brushes, means for maintaining a substantially constant induced armature voltage between the auxiliary brush and one main brush, and means for varying and reversing the induced armature voltage between the auxiliary brush and the other main brush.

3. A variable-voltage self-exciting commutator machine, comprising main brushes displaced from each other by substantially 180 electrical degrees, an auxiliary brush intermediate the main brushes, field poles between said auxiliary brush and a main brush, field coils on said poles connected between said auxiliary brush and said main brush, field poles between said auxiliary brush and the other main brush, field coils on the last-mentioned poles, and circuit connections for the last-mentioned field coils including means for varying the current therein.

4. A variable-voltage self-exciting commutator machine, comprising main brushes displaced from each other by substantially 180 electrical degrees, an auxiliary brush intermediate the main brushes, field poles between said auxiliary brush and a main brush, field coils on said poles connected between said auxiliary brush and said main brush, field poles between said auxiliary brush and the other main brush, field coils on the last-mentioned poles, and circuit connections for the last-mentioned field coils including means for varying and reversing the current therein.

5. A variable-voltage self-exciting commutator machine, comprising main brushes displaced from each other by substantially 180 electrical degrees, an auxiliary brush intermediate the main brushes, field poles between the auxiliary brush and a main brush, field coils on said poles connected between said auxiliary brush and said main brush, a resistance connected between said auxiliary brush and said main brush, field poles between the auxiliary brush and the other main brush, field coils on the last-mentioned poles, and means for connecting the terminals of the last-mentioned field coils to points on said resistance and shifting the points of connection to vary the current in said last-mentioned field coils.

In witness whereof, I have hereunto set my hand this 10th day of April, 1909.

JOSEPH L. BURNHAM.

Witnesses:
BENJAMIN B. HULL,
HELEN ORFORD.